(12) United States Patent
Gleaves et al.

(10) Patent No.: US 7,856,284 B1
(45) Date of Patent: Dec. 21, 2010

(54) INCREMENTAL TRANSFORMATION AND PROGRESSIVE RENDERING OF MULTIDIMENSIONAL DATA

(75) Inventors: Durin Gleaves, Seattle, WA (US); Shenzhi Zhang, Bellevue, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1051 days.

(21) Appl. No.: 11/585,782

(22) Filed: Oct. 24, 2006

(51) Int. Cl.
*G06F 17/00* (2006.01)
(52) U.S. Cl. .................................................. 700/94
(58) Field of Classification Search ............... 700/94; 381/98–103; 704/276, 500–504
See application file for complete search history.

(56) References Cited

U.S. PATENT DOCUMENTS

| 6,782,365 | B1 * | 8/2004 | Case | 704/278 |
| 2007/0078541 | A1 * | 4/2007 | Rogers | 700/94 |
| 2007/0100606 | A1 * | 5/2007 | Rogers | 704/205 |

\* cited by examiner

*Primary Examiner*—Andrew C Flanders

(57) ABSTRACT

Audio data is processed and displayed in a series of spectral displays that progressively display the data at greater and greater resolution. Processing and displaying of the audio data is performed in a series of passes. For each pass, spectral data is generated from a portion of the audio data. The spectral data is cumulated and a display is rendered from the cumulated spectral data. This process is repeated until all of the passes have been completed.

20 Claims, 9 Drawing Sheets

INCREMENTAL TRANSFORMATION AND PROGRESSIVE RENDERING OF MULTIDIMENSIONAL DATA

BACKGROUND

With the rapid advancement of signal processing technologies, digital audio technologies has emerged as the preferred method for transferring and storing audio information. Digital audio comprises analog audio signals that are represented in a numerical form, such as binary integers. Conversion from an analog signal to a numerical form typically involves sampling the analog signal at various times and converting the sampled portions of the analog signal to numerical values which are usually represented in binary form and often referred to as audio data.

Digitizing analog audio signals has its advantages in that it makes managing the audio signals easier. For example, audio represented in binary form makes it possible to transfer audio signals over digital mediums, such as the Internet. Moreover, binary digitized audio makes it possible to store, play, edit and otherwise manipulate the audio signals on, e.g., a computer system.

One coding technique that is widely used to generate digital audio from analog audio signals is Pulse-code Modulation (PCM). PCM is a wave-form coding technique that involves converting analog signals into a series of numerical values that represent amplitudes of the analog signals at various times. A PCM representation of an analog signal is typically generated by measuring (sampling) an instantaneous amplitude of the analog signal, and quantizing the result. Quantization involves converting each sampled value into a discrete value that is usually represented in numerical form, such as a binary integer. Quantization may be accomplished using specially programmed analog-to-digital converters which are configured to sample the amplitude of an analog signal at regular intervals and convert the sampled amplitude to a binary value. The quantized samples may then be stored as audio data in a data file contained on a digital medium, such as a disk, for later playback. Playback may be performed by converting the quantized samples to an analog signal using specially programmed digital-to-analog converters. A file format that is often used to store PCM encoded data on a computer system is the well-known Waveform Audio Format (WAV). Other file formats used to store PCM encoded data in various forms include the well-known Moving Picture Experts Group (MPEG)—1 Audio Layer 3 (MP3) format.

Some computer-based applications have been specially designed to enable users to edit PCM encoded audio data contained in files, such as WAV files and MP3 files. Often these applications present the audio data to the a user in the form of different type of displays, including waveform displays and spectral displays. Waveform displays typically depict a sinusoidal shape of the analog signal as represented by the audio data. Spectral displays, on the other hand, typically depict spectral aspects of the analog signal as represented by the audio data. These aspects may include phase, pan position and frequency of the analog signal.

One common form of spectral display is a frequency spectral display. A frequency spectral display displays data as a function of time, frequency and amplitude where time may be displayed on a horizontal axis, frequency may be displayed on a vertical axis and amplitude may be displayed in the form of a color or intensity. Here, audio data may be analyzed using, e.g., Fast Fourier Transforms (FFTs), to identify various frequency components (e.g., audio frequencies) represented in the audio data. The identified frequency components may then used to render the frequency spectral display.

SUMMARY

Computer applications typically render spectral displays by (1) acquiring all of the data to be used to generate the spectral display, (2) generating spectral data from all of the acquired data, and then (3) rendering the spectral display from the generated spectral data. The spectral data may include pixel information that represents spectral components (e.g., frequency components) of the analog signal as well as the amplitude of those spectral components.

One problem with this approach is that a user has to wait until all of the audio data associated with generating the spectral data has been processed before the user actually sees the display. Often processing the audio data involves complex processes, such as Fast Fourier Transforms (FFTs), which tend to be compute-intensive. Depending on the amount of data being processed and the computing capabilities of the computer system, this wait could be significant and impact the productivity of the user.

The techniques described herein overcome these shortcomings by performing a series of passes wherein each pass (1) generates a set of spectral data from a portion of the audio data to be displayed and (2) displays the generated spectral data upon completion of each pass. By applying spectral analysis (e.g. Fast Fourier Transforms) on the audio data at different levels or granularities, a high-level pass can complete quickly to produce spectral data of low resolution and allow a quick display of some data for the user to view. While the user is viewing that data, more fine granular spectral analysis can be applied in the background. As each pass completes, the current low-resolution view of the audio data can be supplemented with the results of the next pass to provide a higher resolution view of the audio data. From a user's perspective, the spectral data initially presented appears to become more and more detailed as each spectral analysis pass of the data completes and the results from that pass are rendered in conjunction with (e.g., on top of) results displayed in previous passes that have already completed.

More specifically, in accordance with the techniques described herein, for each pass, a portion of audio data is identified from the audio data that is to be displayed. Spectral data is generated from the identified portion of audio data. The generated spectral data is cumulated. A display is then rendered from the cumulated spectral data. Note that, as used herein, a portion relates to a part of a whole that is set off or abstracted from the whole. This part may include some or most of the whole but not all of the whole. Thus, for example, a portion of audio data contained in a file includes at least some of the audio data in the file but not all of the audio data in the file.

Operating on only a portion of the overall data per pass enables a rough spectral display of the audio data to be generated and displayed in short order. Providing this rough spectral display gives the user a rough sketch of the spectral components represented in the audio data and allows the user to begin operating on (e.g., manipulate) the data quickly rather than having to wait until all of the data has been processed and displayed before the user can begin operating on the data.

In an embodiment of the techniques described herein, audio data to be displayed in a frequency spectral display and manipulated by a user is maintained in a data file, accessible to a computer system. A user starts a software application on a computer system to edit the audio data. The application processes the audio data in a series of passes. For each pass, the application (1) identifies a portion of the audio data contained in the data file, (2) generates spectral data from the identified portion of audio data, (3) cumulates the spectral data and (4) renders the cumulated spectral data in a spectral display that is displayed to the user on a display unit. Illustratively, The audio data that is identified for each pass is identified in such a manner so as to cause the resolution of the spectral display to increase with each successive pass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
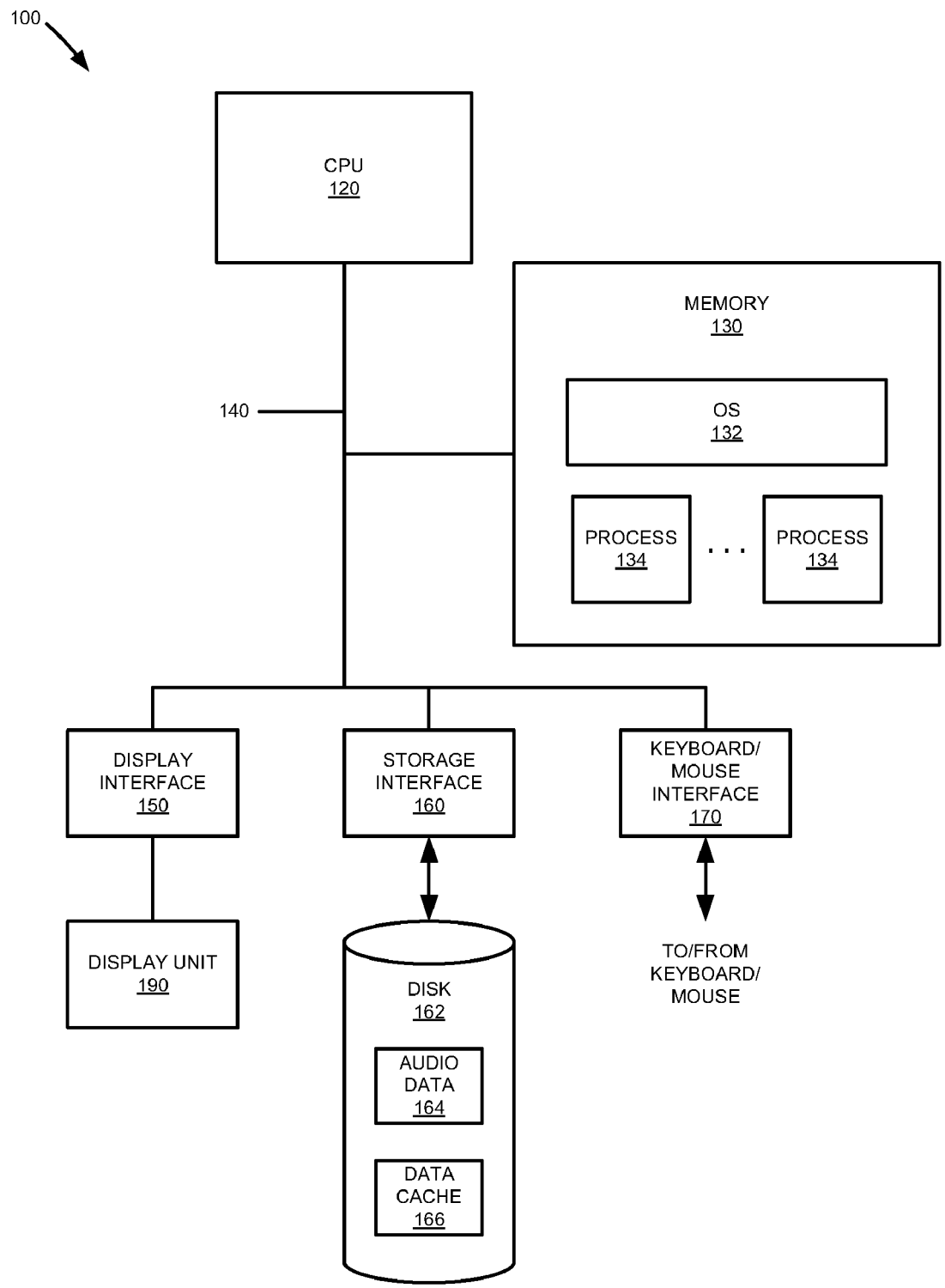
FIG. 1 is a high-level block diagram of an example of a computer system that may be used with the techniques described herein.

FIG. 1 is a high-level block diagram of an example of a computer system 100 that may be used with the techniques described herein. Referring to FIG. 1, system 100 comprises a central processing unit (CPU) 120 coupled to a memory 130 and various interfaces via a local bus 140. The interfaces include a display interface 150, a storage interface 160 and a keyboard/mouse interface 170. It should be noted that computer system 100 is one example of a computer system that may be used with the techniques described herein. Other computer systems, including computer systems far more complex than system 100, may be adapted to take advantage of the techniques described herein. An example of a computer system that may be used with the techniques described herein is an International Business Machines (IBM) compatible Personal Computer (PC), such as a Dimension series computer system available from Dell Incorporated, Round Rock, Tex.

The CPU 120 is a conventional processor which comprises circuitry for executing instructions and manipulating data contained in the memory 130 including instructions and data that implement aspects of the techniques described herein. The local bus 140 is a point-to-point interconnect bus configured to couple various entities contained in system 100 including the processor 120, the memory 130 and interfaces 150, 160 and 170 and enable data and signals to be transferred between these entities.

The display interface 150 is a conventional display interface (e.g., a graphics card) that comprises circuitry configured to enable the processor 120 to display information on the display unit 190, such as a spectral data generated from audio data. Display unit 190 is a conventional display unit, such as a Cathode Ray Tube (CRT) or a Liquid Crystal Display (LCD) display. The keyboard/mouse interface 170 comprises circuitry configured to interface a conventional keyboard device (not shown) and mouse device (not shown) to the system 100 and enable data and signals to be transferred between these devices and the system 100.

The storage interface 160 is a conventional storage device interface comprising circuitry configured to interface storage devices, such as disk unit 162, to the bus 140 and enable data and signals to be transferred between the storage devices and entities on bus 140. Disk unit 162 is a conventional disk unit configured to store information, such as data contained in data files. Disk unit 162 contains audio data 164 and data cache 166. Audio data 164 is a data file configured to hold audio data acquired by system 100. Data cache 166 is illustratively a data file that, as will be described further below, is configured to hold spectral data that is generated from audio data contained in data file 164.

Memory 130 is a computer-readable medium implemented as a conventional random access memory (RAM) comprising various RAM devices, such as dynamic RAM (DRAM) devices. Memory 130 is configured to hold various software including operating system (OS) 132 and one or more processes (134). The OS 132 is a conventional operating system comprising computer-executable instructions and data that implement various operating system functions, such as scheduling processes for execution on the processor 120 and managing various entities (e.g., memory 130) contained in the system 100. The processes 134 are software processes that execute under control of the OS 132. These processes contain computer-executable instructions and data that may include computer-executable instructions and data that implement aspects of the techniques herein.

It should be noted that functions performed by the system 100, including functions that implement aspects of the techniques described herein, may be implemented in whole or in part using some combination of hardware and/or software. It should be further noted that computer-executable instructions and/or computer data that implement aspects of the techniques described herein may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like may be encoded to carry computer-executable instructions and/or data that implement aspects of the techniques described herein, e.g., in a communication network.

Figure 2:
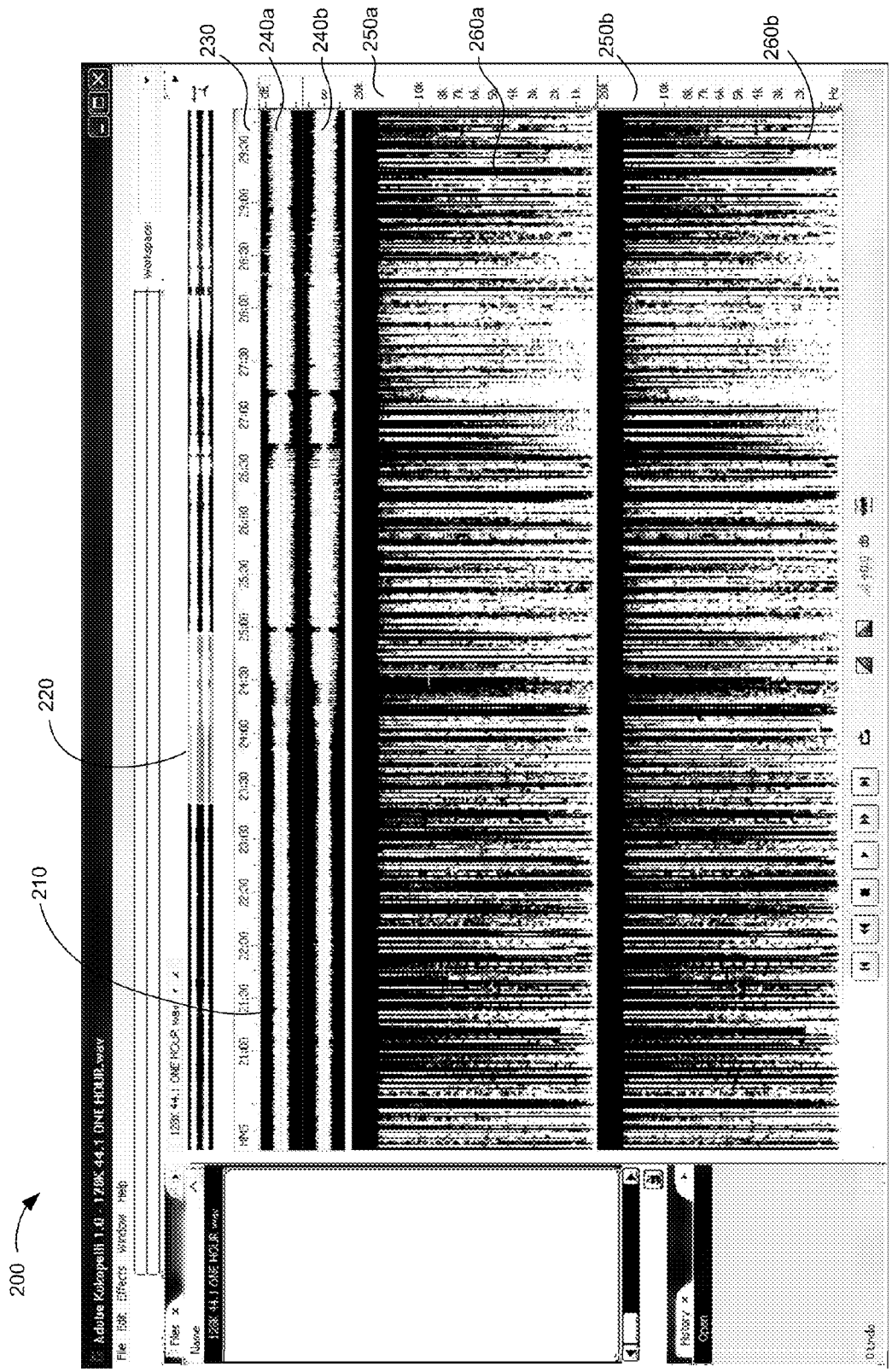
FIG. 2 illustrates an example of a display that may be used with the techniques described herein.

In accordance with aspects of the techniques described herein, audio data is processed and rendered in a display. FIG. 2 is an illustration of a display 200 that may be used with the techniques described herein. Referring to FIG. 2, the display 200 comprises a waveform display of audio data 210, a selection of a portion of audio data 220 in the waveform display 210, a time line associated with the selected portion of audio data 230, a waveform display of the selected portion of audio data 240a-b, a spectral display of the selected portion of the audio data 260 and a frequency scale for the frequency spectrum display 250a-b.

The waveform display 210 is illustratively a waveform display of the left and right channels of the audio data. The selection of a portion of the audio data 220 indicates a portion of the audio data that is displayed in the waveform 240 and spectral 260 displays. Illustratively, a user makes this selection by dragging a mouse cursor over the waveform display 210 while holding a button down on the mouse. The waveform display 240*a*-*b* is a waveform display of the left channel 240*a* and right channel 240*b* of the selected portion of audio data 220. Likewise, the spectral display 260*a*-*b* is a spectral display of the left channel 260*a* and right channel 260*b* of the selected portion of audio data 220. Illustratively, the spectral display is a frequency spectral display that depicts frequency components contained in the selected audio data. It should be noted that other types of spectral displays may be used with the techniques described herein.

In accordance with the techniques described herein, audio data are processed and displayed in a series of passes. For each pass, a set of spectral data is generated from a portion of the audio data. The generated set of spectral data is then displayed in a spectral display, such as spectral display 260. As each pass completes more spectral data is available to be displayed which enables latter displays to supplement already displayed data from former completed passes. This enables showing more detail and higher resolution of spectral components of the audio data than what was displayed in earlier displays from previous lower-resolution passes. By applying concurrent spectral analysis (e.g., Fast Fourier Transforms) on the audio data at different levels or granularities, a high-level pass can complete quickly to produce spectral data of low resolution. Since the low resolution pass completes quickly, it produces results that allow a quick display of some data that a user may initially view. While the user is viewing that data, more fine granular spectral analyses are applied (e.g., each is being computed concurrently, but at different levels of granularity) and, as each pass completes, the current low resolution view of the audio data is supplemented with more detailed results from finer and finer completed passes. From a user's perspective, the spectral data initially presented appears to become more and more detailed as each spectral analysis pass of the data completes and the results from that pass are rendered in conjunction with (e.g., on top of) the already currently visible spectral data from former spectral analysis passes that have already completed.

FIGS. 3A-D illustrate these concepts as applied to a selected portion of audio data contained in a data file named "ONE HOUR.wav". The selected portion of audio data spans from a time period starting at a 20 minute mark (20:00) and ending at a 30 minute mark (30:00) of the audio data contained in the data file.

Figure 3A:
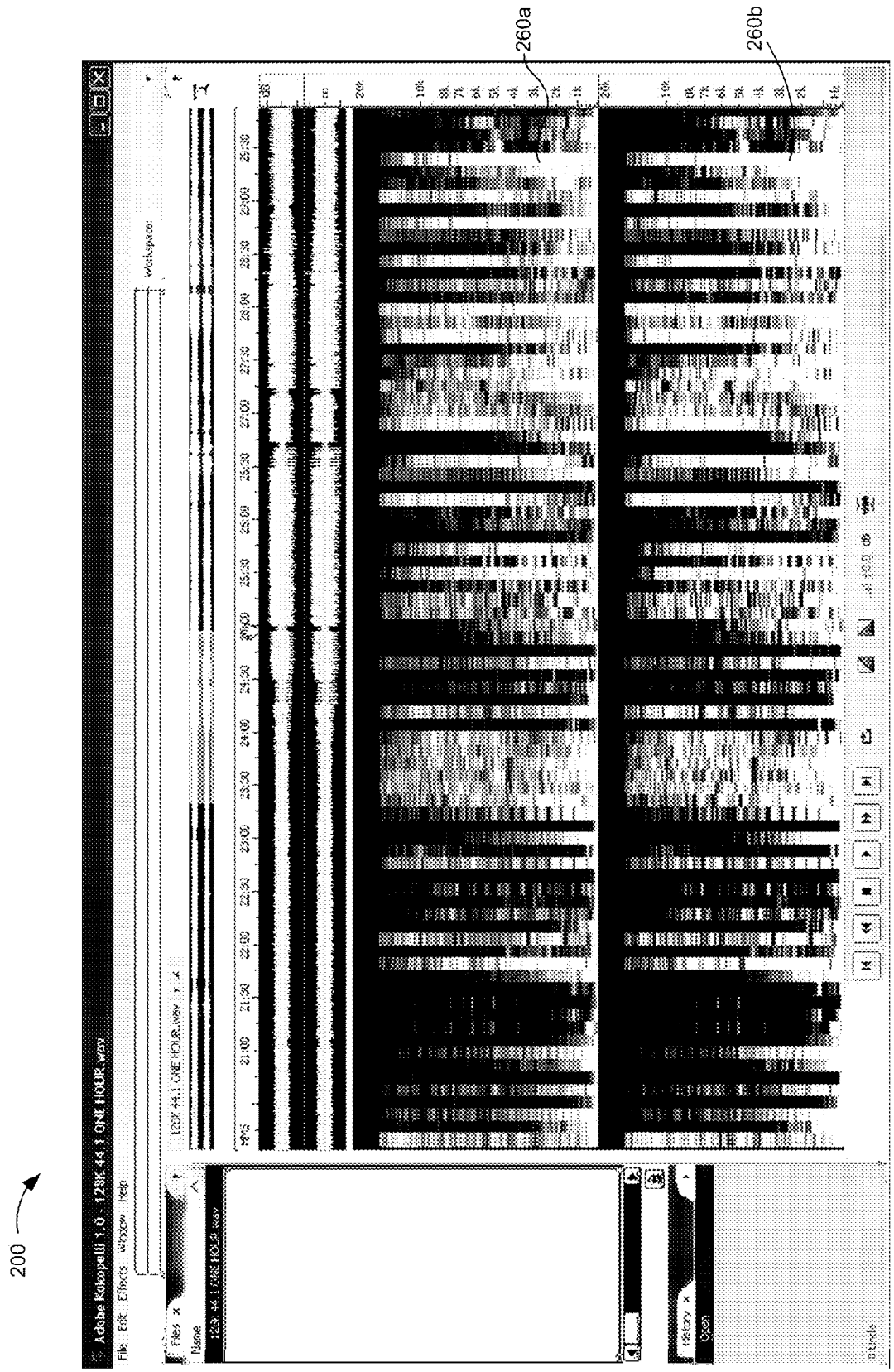
FIGS. 3A-D illustrate an example of a progression of displays that may be used with the techniques described herein.

FIG. 3A illustrates a display of spectral data generated in a first pass. The portion of audio data used to generate the spectral data comprises audio data associated with various time intervals in the selected portion of audio data. These time intervals are illustratively selected by starting at a particular time, using an interval of audio data starting from that time, skipping over a period of time to a "next" time, using an interval of audio data for a time interval starting at that time and so on until the end of the selected portion of audio data is reached. For example, in FIG. 3A, the first interval of data starts at time 20:00, the interval of data is 100 milliseconds (ms) and the time period to the next interval of data is 8 seconds. Thus, the portion of audio data used to generate the spectral display shown in FIG. 3A includes a 100 ms interval of audio data starting at time 20:00, a 100 ms interval of audio data starting at time 20:08, a 100 ms of audio data at time 20:16 and so on until the end of the selected audio data is reached. Note that 8 seconds of audio data is skipped between intervals.

Figure 3B:
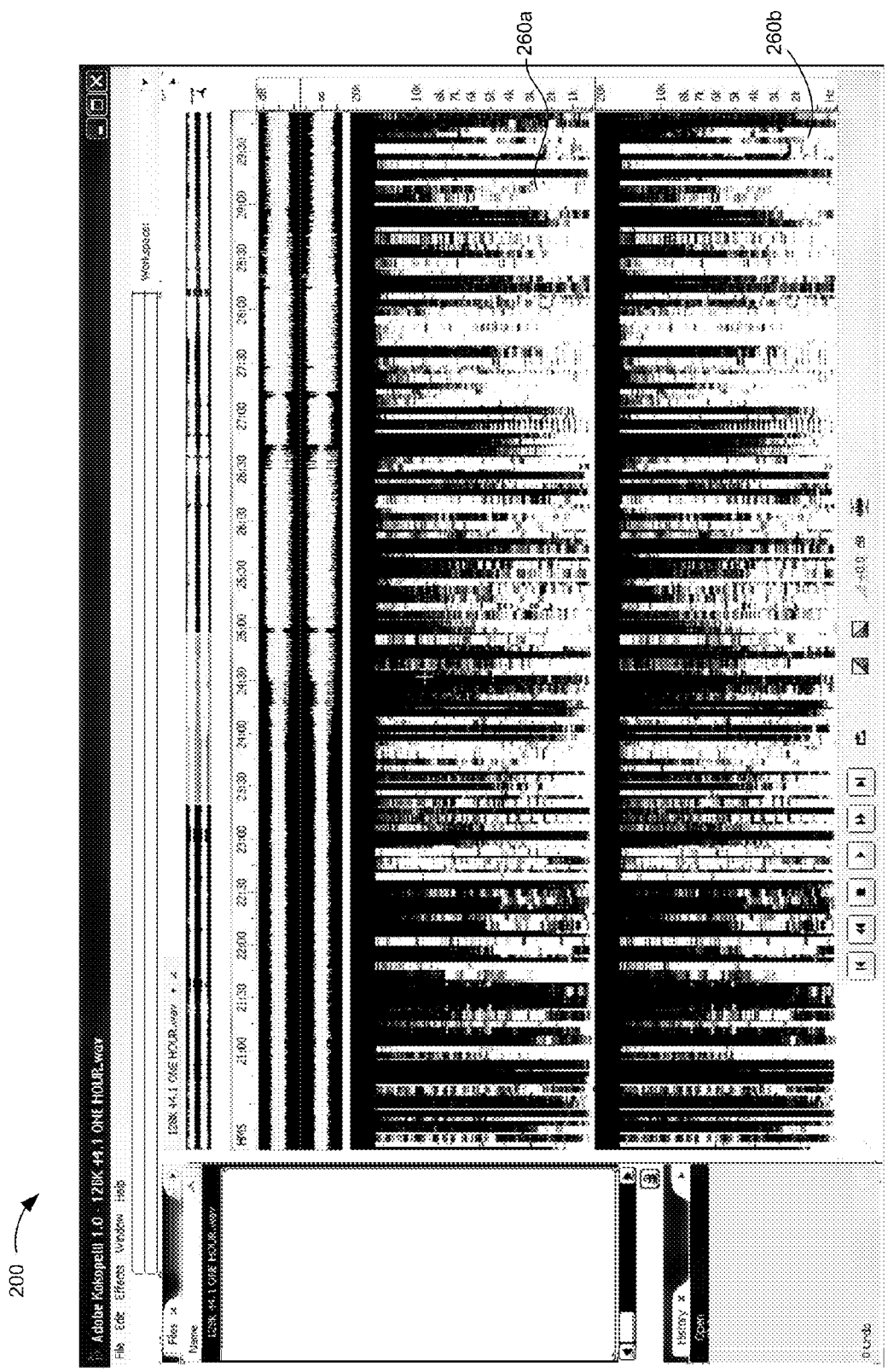

FIG. 3B illustrates a display of spectral data generated in the first pass as well as additional spectral data generated in a second pass. Here, the portion of audio data used to generate the spectral data for the second pass includes audio data that was skipped in the first pass. The portion of audio data used to generate the spectral display shown in FIG. 3B includes a 100 ms interval of audio data starting at time 20:04, a 100 ms interval of audio data starting at time 20:12, a 100 ms of audio data starting at time 20:20 and so on until the end of the selected data is reached. Note that 8 seconds of audio data is skipped between intervals.

Figure 3C:
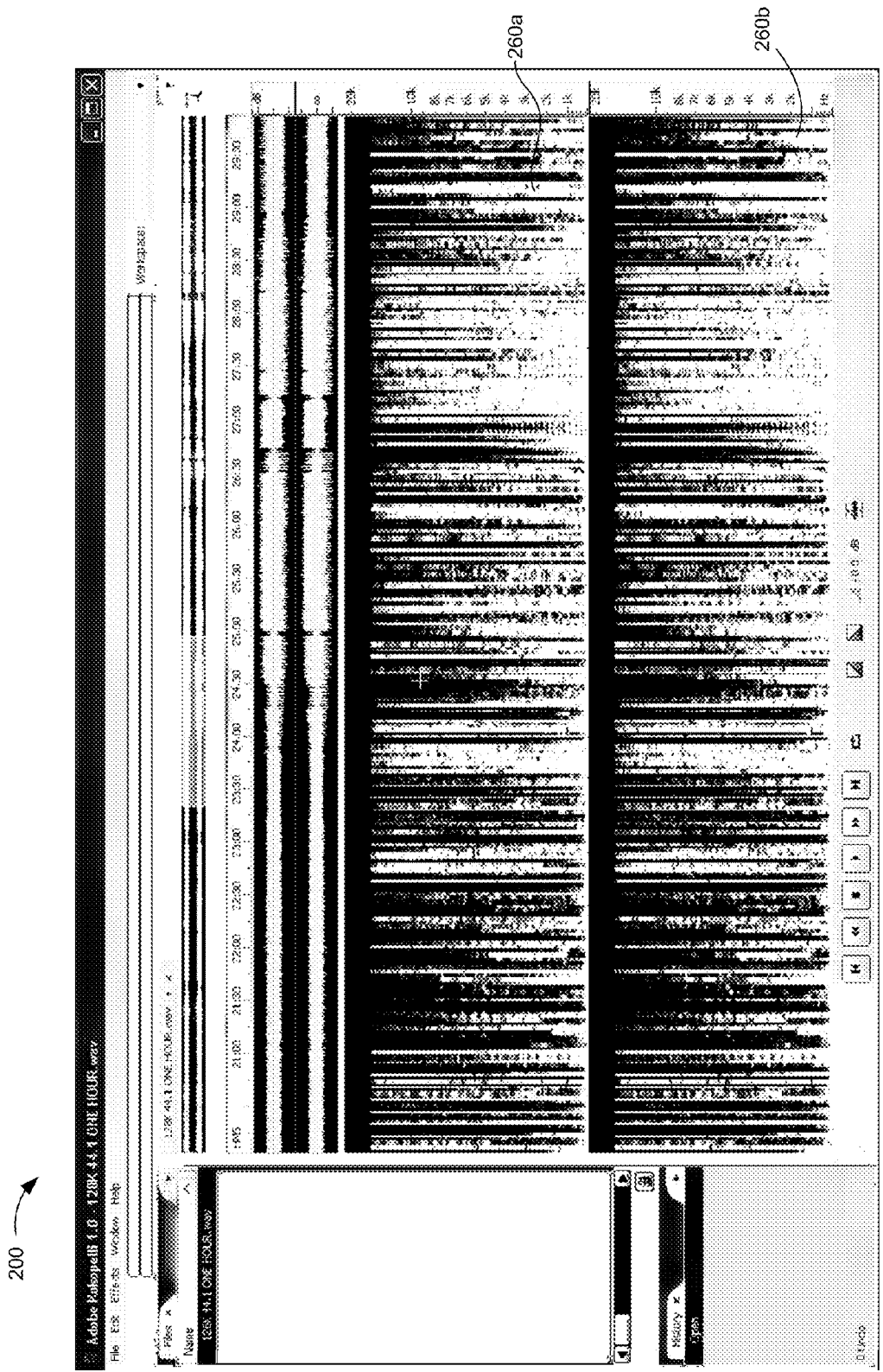
Figure 3D:
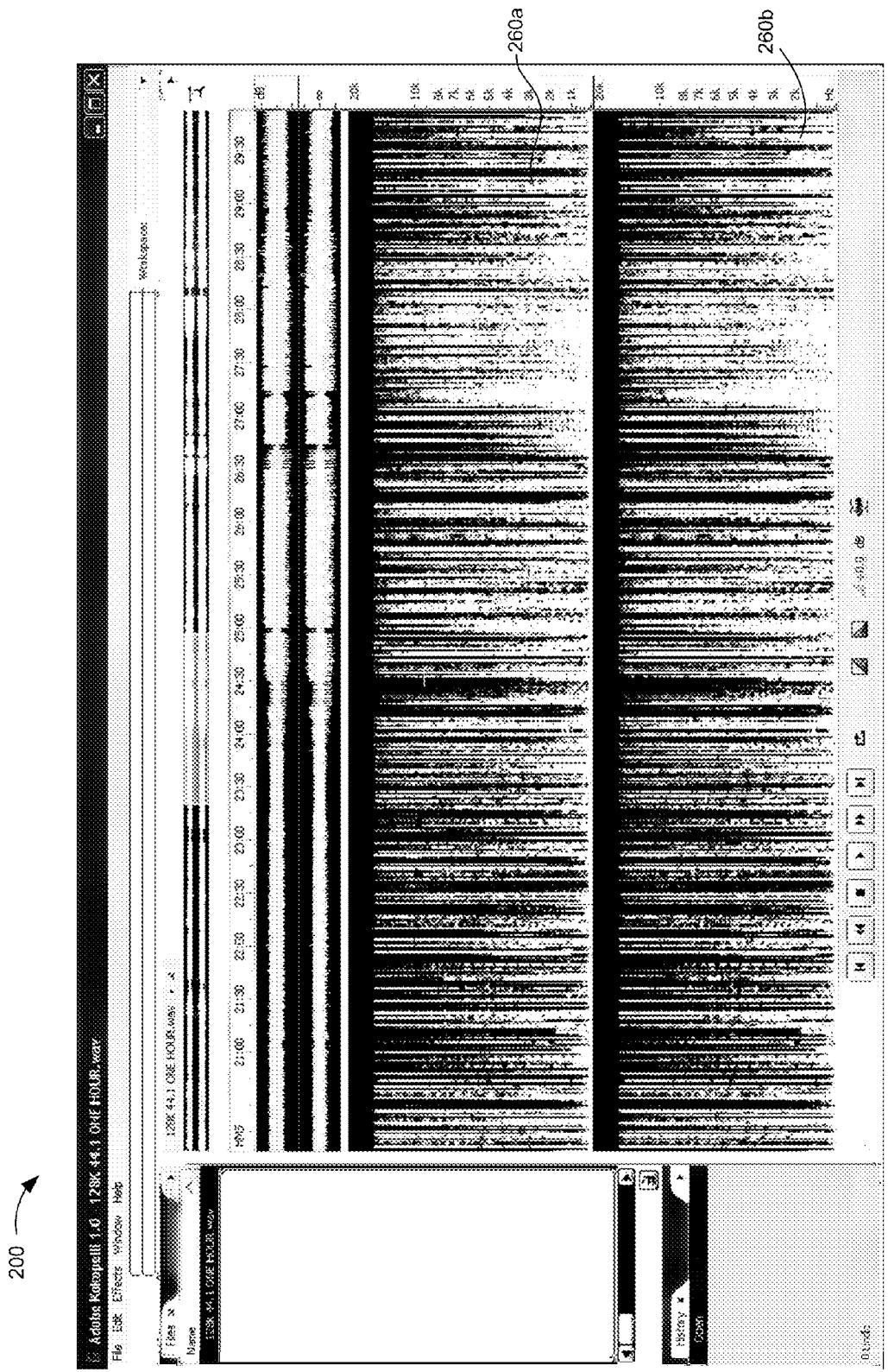

Likewise, FIGS. 3C and 3D illustrate displays of spectral data generated in previous passes as well as spectral data generated for a third pass and a fourth pass, respectively. As with the second pass, the portion of audio data used to generate the spectral data for these passes includes audio data that was skipped in previous passes. Thus, the audio data used to generate spectral data for the third pass includes a 100 ms interval of audio data starting at time 20:02, a 100 ms interval of audio data starting at time 20:06, a 100 ms interval of audio data starting at time 20:10 and so on until the end of the selected data is reached. Note that for the third pass, 4 seconds of audio data is skipped between intervals. Likewise, the data used to generate the spectral data for the fourth pass, includes 100 ms intervals of audio data starting at times 20:01, 20:03, 20:05, 20:07, 20:09 and so on until the end of the selected data is reached. Note that in the fourth pass, 2 seconds of audio data is skipped between intervals. Also note that with each pass, spectral data is being generated and displayed to provide a progressively higher resolution spectral display of the audio data.

The first display should provide enough detail to enable a user to begin work on (e.g., editing) the audio data. Thus, e.g., a software application that implements the techniques described herein may be configured to allow a user to edit or otherwise manipulate the audio data after the first display is rendered. This obviates having to make the user wait until all processing of the data is complete and a final display is rendered before the user begins work on the data.

Generally then, the system disclosed herein is able to obtain audio data having a predetermined length and is able to generate a series of spectral data segments (e.g. via application of a Fast Fourier Transform) each corresponding to one of a series of selected time intervals across the length of the audio data. A total combined length of the series of selected time intervals is less than the predetermined length of the audio data. Thus to quickly compute these spectral data segments, a small slice of the audio data may be used. The system then renders each spectral data segment of the series at a spectral display location corresponding to the selected time intervals of the audio data for which that spectral data segment was generated. This display however may leave visual gaps between the display locations not corresponding to the selected time intervals of the audio data for which that spectral data segment was generated. Accordingly, to fill these potential visual gaps, the system concurrently renders at least one spectral data segment of the series at a spectral display location not corresponding to the selected time interval of the audio data for which that spectral data segment was generated. In one configuration, to fill all of the visual gaps between time intervals for which spectral data was computed, the system concurrently renders at least one spectral data segment of the series at spectral display locations corresponding to time intervals between the selected time interval of the audio data for which that spectral data segment was generated and a next adjacent selected time interval.

In one configuration, the system repeats generating a series of spectral data segments, renders each spectral data segment of the series and concurrently renders at least one spectral data segment of a series for multiple iterations. In each iteration, the system generates a series of spectral data segments for different spectral display locations corresponding to different time intervals of the audio data as compared to former iterations. In this manner, at each pass or iteration, the system computes spectral data over different time slices or intervals such that each pass fills in more and more of the visual gaps. By concurrently rendering all spectral data computations from each pass, the display appears to fill in with more and more detail as each pass or iteration completes.

Figure 4:
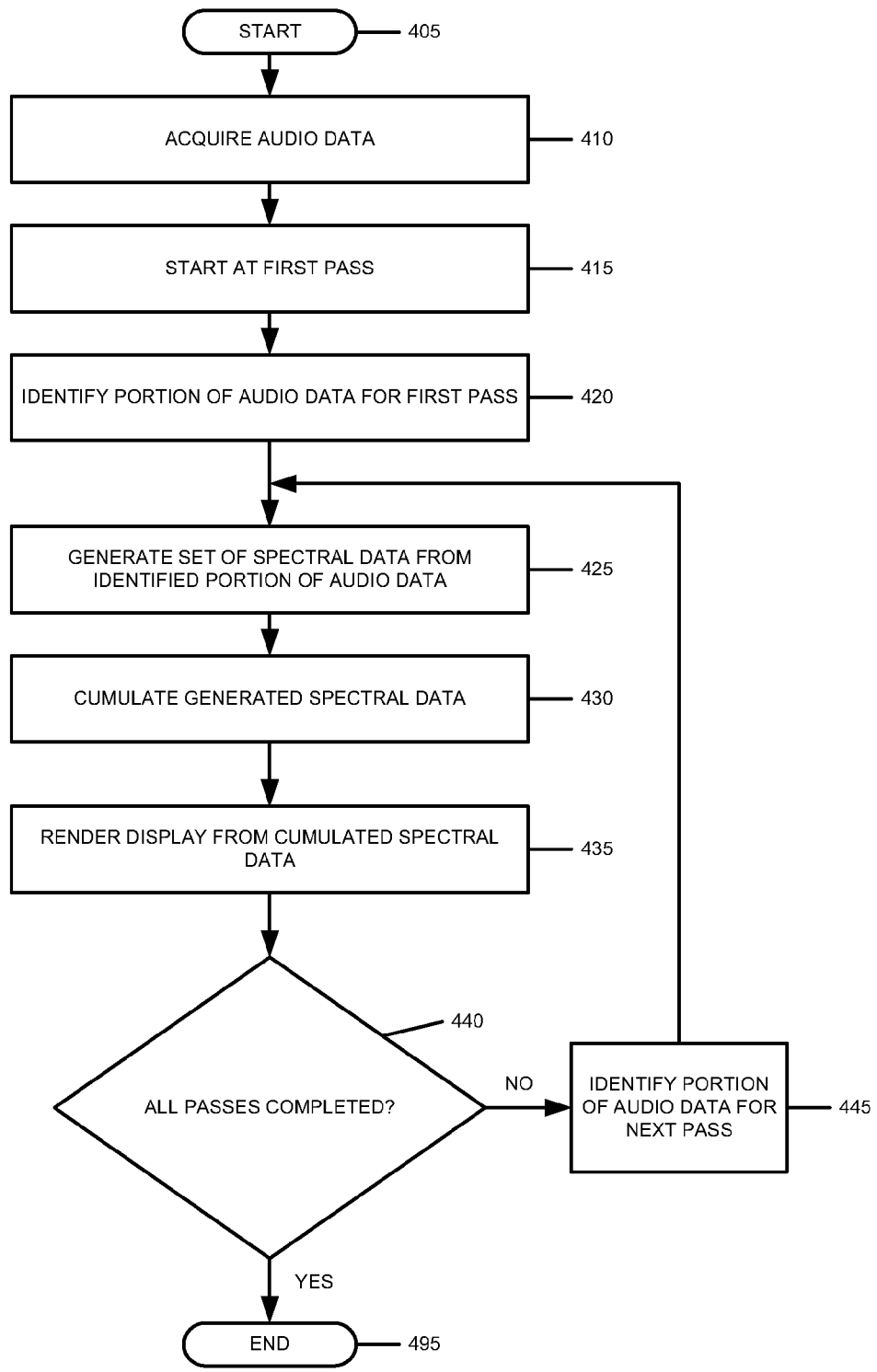
FIG. 4 is a flow chart of a sequence of steps that may be used to generate spectral data that represents audio data and render a series of displays from the spectral data in accordance with the techniques described herein.

FIG. 4 is a flow chart of a sequence of steps that may be used to generate spectral data that represents audio data and render a series of displays from the spectral data in accordance with the techniques described herein. The sequence begins at step 405 and proceeds to step 410 where the audio data to be displayed is acquired. This step may include, e.g., reading the audio data from a data file, such as data file 164. At step 415, starting with a first pass, a first portion of audio data is identified from the acquired audio data (step 420). Note that the audio data identified for a pass may include audio data associated with time intervals that, in turn, are associated with the pass. Thus, for example, as noted above, the identified data may include audio data associated with a time interval (e.g., a 100 ms interval) starting at a beginning time and audio data associated with successive time intervals that start some increment of time beyond the beginning time (e.g., audio data associated with a time interval that starts 8 seconds after the beginning time).

Next, at step 425, spectral data is generated from the identified portion of audio data. As will be described further below, the generated spectral data may include pixel data which represents pixels that, e.g., represent spectral components of the audio data and that are displayed in a spectral display rendered from the spectral data. At step 430, the generated spectral data is cumulated. As will be described further below, a data caching mechanism may be used to cumulate the spectral data. Next, at step 435, a display is rendered from the cumulated spectral data.

At step 440, a check is performed to determine if all passes have been completed. If not, the sequence proceeds to step 445 where the portion of audio data used in the next pass is identified. The sequence then returns to step 425. Otherwise, if at step 450 all of the passes have completed, the sequence proceeds to step 495 where the sequence ends.

For example, assume a user at system 100 wishes to display a portion of the audio data stored in a file 164 in a spectral display. Further, assume that file 164 is the above described "ONE HOUR.wav" file. In addition, assume that data cache 166 is used to hold pixel data generated by these passes and that the cache 166 is empty (i.e., contains no pixel data).

The user starts a process 134 which is configured to implement the techniques describe herein and specifies file 164 as the file containing the portion of audio data to be displayed. The process 134 acquires the audio data from the file 164 (step 410) and displays a waveform display 210 of the audio data on display unit 190. The user specifies the portion of audio data to be displayed in the spectral display area 260 of the display 200 by selecting the portion of data in the waveform section 210, as described above. Assume the user selects a portion that spans from 20:00 to 30:00 as described above.

Starting at a first pass (step 415), the process 134 identifies a portion of audio data for the first pass (step 420). Assume the identified audio data includes the audio data for the time intervals described above for the first pass. Next, the process 134 generates a set of spectral data from the identified portion of audio data (step 425) and cumulates the spectral data e.g., in memory 130 (step 430). The process 134 then uses the cumulated spectral display to render a display 200 of the audio data on screen 190, as described above (step 435). The process 134 then checks to determine if all passes have been completed (step 440). Assuming all passes have not been completed, the process 134 identifies the portion of audio data for the next pass (step 445) and repeats the above described technique for this pass as well as the third and fourth passes.

Figure 5A:
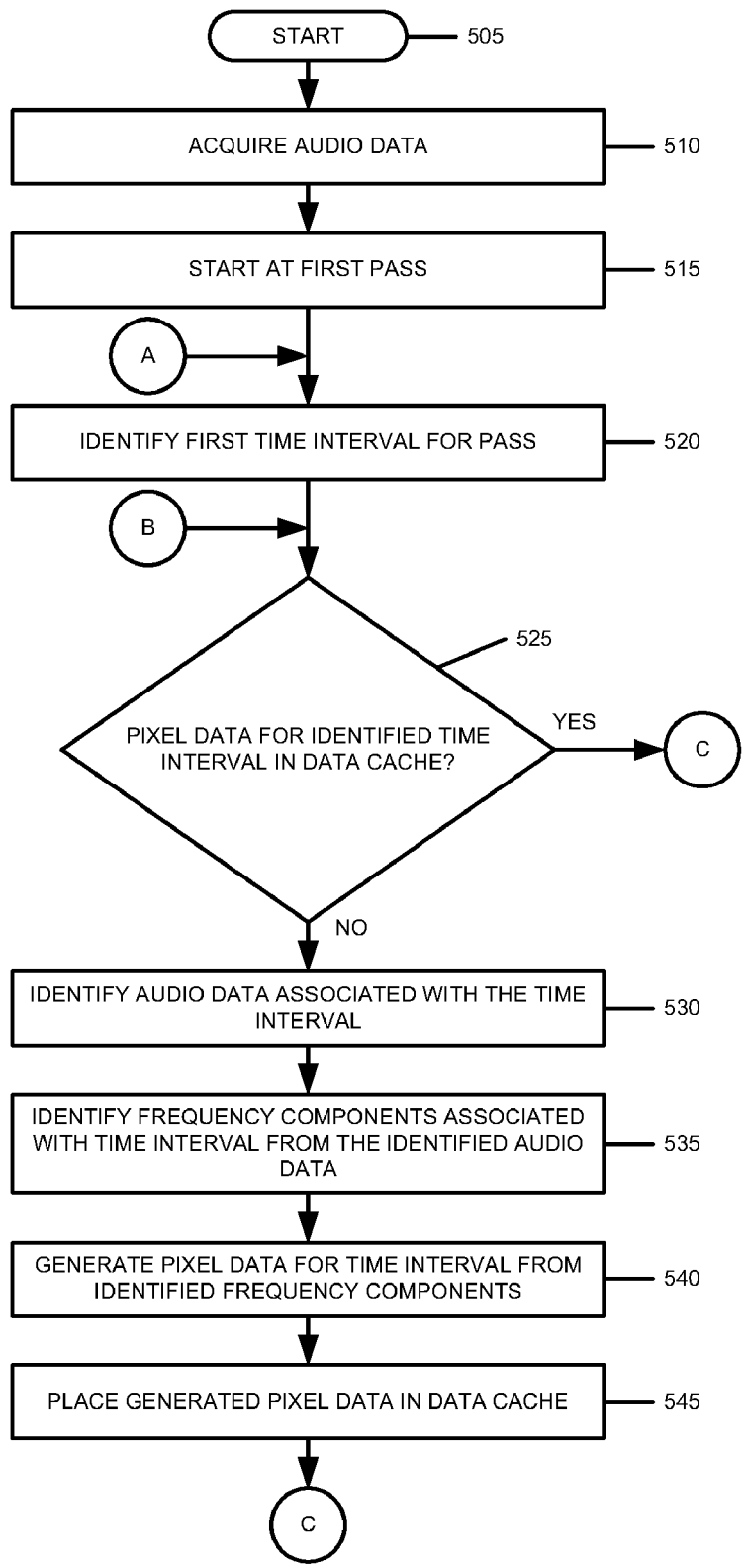
FIGS. 5A-B are a flow chart of a sequence of steps that may be used generate spectral data in the form of pixel data that represents spectral components of audio data and render a series of displays from the pixel data in accordance with the techniques described herein.
Figure 5B:
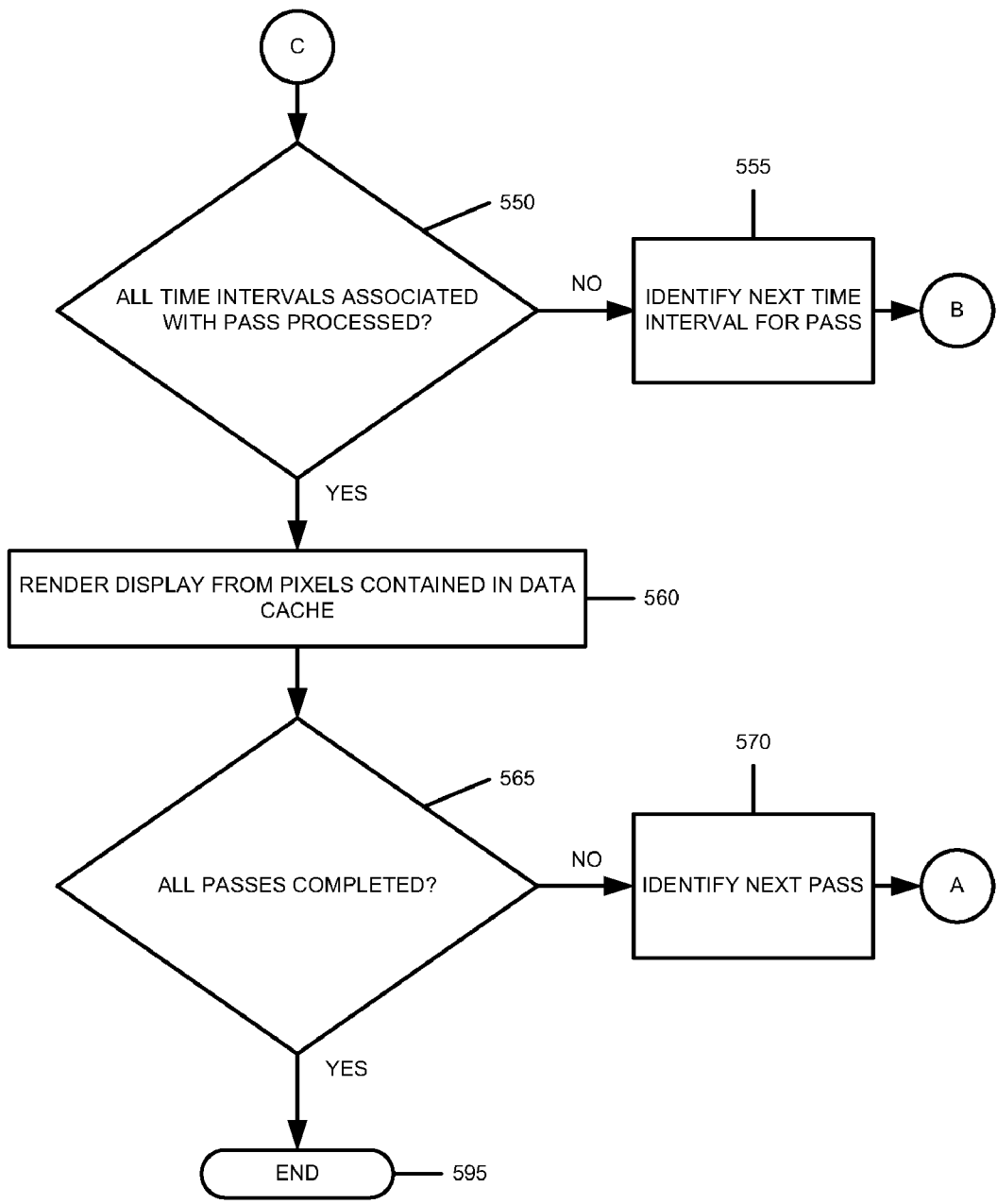

In accordance with the techniques described herein, spectral data presented in a spectral display may be rendered as a series of pixels where each pixel represents a particular spectral component (e.g., frequency component) at a particular period of time. Moreover, the color or intensity of the pixel may indicate a magnitude (amplitude) of the spectral component. FIGS. 5A-B are a flow chart of a sequence of steps that may be used generate spectral data in the form of pixel data that represents spectral components of audio data and render a series of displays from the pixel data in accordance with the techniques described herein.

Referring to FIGS. 5A-B, the sequence begins at step 505 and proceeds to step 510 where the audio data to be displayed in the spectral display is acquired. Starting at the first pass (step 515), a starting time interval for the pass is identified (step 520). Note that this starting time interval may be at the beginning of the acquire audio data or at some point in time after the beginning of audio data. For example, as described above, the starting time interval for the first pass may be the first 100 ms of time starting at the beginning of the acquired audio, the starting time interval for the second pass may be 100 ms of time that begins four seconds later, and so on. At step 525, a check is performed to determine if pixel data, that represents spectral components (e.g., frequency components) associated with audio data that is further associated with the identified interval, is present in a data cache. Note that the data cache is used to store previously generated pixel data. Maintaining a cache for the pixel data advantageously obviates having to regenerate pixel data that had been previously generated.

If the pixel data is present in the cache, the sequence to proceeds to step 550 (FIG. 5B). Otherwise, at step 530, audio data associated with the time interval is identified. Next, at step 535, the identified audio data for the time interval is analyzed and frequency components associated with the time interval are identified. This step may include identifying the frequency components represented in the audio data as well as their amplitude. Illustratively, the frequency components are identified by performing a Fast Fourier Transform (FFT) on the identified audio data.

At step 540, pixel data is generated for the time interval from the identified frequency components. Illustratively, each individual pixel contains information that represents a frequency component and an amplitude of that frequency component at that particular time interval. The information may include the location of the pixel in the spectral display 260 and a color of the pixel or intensity of the pixel which represents an amplitude of the frequency component. At 545, the generated pixel data is placed in a data cache.

At step 550 (FIG. 5B), a check is performed to determine all of the time intervals associated with the pass have been processed, as described above. If not, the sequence proceeds to step 555 where the next time interval is determined. The sequence then returns to step 525 to process the audio data associated with the next time interval, as described above. If at step 550, all of the time intervals associated with the pass have been processed, the sequence proceeds to step 560 where a display is rendered from the pixel data contained in the data cache.

Next, at step 565, a check is performed to determine if all passes have been completed. If not, the sequence proceeds to step 570 where the next pass is determined. The sequence then returns to step 525 to process the audio data associated with the next pass, as described above. Otherwise, if all of the passes have been completed, the sequence proceeds to step 595 where the sequence ends.

For example, assume a user at system 100 wishes to display audio data stored in a file 164 in a spectral display. Further, assume that file 164 is the above described "ONE HOUR.wav" file. In addition, assume that data cache 166 is used to cache pixel data generated by these passes and that the cache 166 is empty (i.e., contains no pixel data). The user starts an application 134 which is configured to render the display on display unit 190 and specifies the portion of audio data to be displayed in the spectral display 260, as described above. Assume the specified portion of audio begins at time 20:00 and ends at time 30:00, as described above.

The application 134 acquires the portion audio data to be displayed from file 164 (step 510). Beginning with the first pass (step 515), the application 134 identifies a first time interval for the pass (step 520). Assume each time interval comprises 100 ms of audio data and that the time intervals associated with the first pass are 8 seconds apart starting at time 20:00, the time intervals associated with the second pass are 8 seconds apart starting at time 20:04, the time intervals associated with the third pass are 4 seconds apart starting at time 20:02 and the time intervals associated with the fourth pass are 2 seconds apart starting at time 20:01, as described above. Thus the first time interval identified for the first pass is a 100 ms time interval starting at time 20:00.

Next, the application 134 checks the data cache 166 to determine if pixel data associated with the identified time interval is present in the cache 166. Since, as noted above, the data cache is empty (i.e., does not contain any pixel data), the application 134 concludes the pixel data is not present in the cache 166 and proceeds to generate pixel data for the time interval. Specifically, the application 134 identifies audio data associated with the time interval (step 530). Next, the application 134 analyzes the identified audio data to identify frequency components associated with the time interval (step 535). Moreover, this analysis includes identifying amplitudes associated with the identified frequency components. The application 134 then generates pixel data from the identified frequency components (step 540), as described above, and places the generated pixel data in the data cache 166 (step 545).

Next, the application performs a check to determine if all time intervals associated with the pass have been processed (step 550). Assuming there are more time intervals to process, the application identifies the next time interval (step 565) and processes it, as described above. After all time intervals associated with the pass have been processed, the application 134 renders a display 200 from the pixel information contained in the data cache 166 (step 560). The application 134 then performs a check to determine if all of the passes have been completed. As noted above, the spectral display is rendered in a series of four passes, thus, the application 134 determines the next pass to perform (step 570) and repeats the above described process for the second, third and fourth pass. Note that for each pass, additional pixel data is added to the cache 166 which, in turn, causes the spectral data displayed at each pass to be displayed with greater and greater detail.

While techniques described herein have been particularly shown and described with references to particular embodiments, it will be understood by those skilled in the art that various changes in form and details may be made therein without departing from the scope and spirit of the invention encompassed by the appended claims. As such, the foregoing described embodiments are not intended to be limiting. Rather, any limitations to embodiments of the invention are presented in the following claims.

What is claimed is:

1. A method comprising:
   acquiring audio data;
   generating first spectral data at a first resolution of the audio data from a first portion of the audio data;
   rendering a first spectral display from the first spectral data;
   generating second spectral data at a second resolution of the audio data from a second portion of the audio data;
   rendering a second spectral display from the first spectral data and the second spectral data;
   wherein generating first spectral data at the first resolution of the audio data from the first portion of the audio data includes generating pixel data that are displayed in the first spectral display, the first resolution being a resolution view of pixel data representing the audio data; and
   wherein generating second spectral data at the second resolution of the audio data from the second portion of the audio data includes generating pixel data that are displayed in the second spectral display, the second resolution being a resolution view of pixel data representing the audio data, the second resolution having a higher resolution spectral display than the first resolution.

2. The method of claim 1 further comprising:
   cumulating the first spectral data and the second spectral data; and
   wherein the first spectral data and the second spectral data are cumulated in a data cache as pixel data.

3. The method of claim 2 wherein the first spectral data and the second spectral data used to render the second display include first spectral data and second spectral data that has been cumulated.

4. The method of claim 1 wherein the first spectral display is a frequency spectral display of frequency components associated with the first portion of audio data.

5. The method of claim 1 wherein the second spectral display is a frequency spectral display of frequency components associated with the first portion of audio data and the second portion of audio data.

6. The method of claim 1 wherein the step of generating first spectral data further comprises:
   identifying a first plurality of time intervals associated with the audio data; and
   generating the first spectral data from audio data associated with time intervals in the first plurality of time intervals.

7. The method of claim 6 wherein the step of generating the first spectral data from audio data associated with time intervals in the first plurality of time intervals further comprises:
   identifying one or more frequency components represented in audio data associated with time intervals in the first plurality of time intervals; and
   generating the first spectral data from the identified frequency components.

8. The method of claim 6 further comprising:
   wherein the step of generating second spectral data further comprises:
      identifying a second plurality of time intervals associated with the audio data; and
      generating the second spectral data from audio data associated with time intervals in the second plurality of time intervals;
   wherein the step of generating the second spectral data from audio data associated with time intervals in the second plurality of time intervals further comprises:

identifying one or more frequency components represented in audio data associated with time intervals in the second plurality of time intervals; and generating the second spectral data from the identified frequency components.

9. An apparatus comprising:

a audio data; and a processor configured to:
- (a) acquire audio data,
- (b) generate first spectral data at a first resolution of the audio data from a first portion of the audio data,
- (c) render a first spectral display from the first spectral data,
- (d) generate second spectral data at a second resolution of the audio data from a second portion of the audio data, and
- (e) render a second spectral display from the first spectral data and the second, spectral data;

wherein generating first spectral data at the first resolution of the audio data from the first portion of the audio data includes generating pixel data that are displayed in the first spectral display, the first resolution being a resolution view of pixel data representing the audio data; and wherein generating second spectral data at the second resolution of the audio data from the second portion of the audio data includes generating pixel data that are displayed in the second spectral display, the second resolution being a resolution view of pixel data representing the audio data, the second resolution having a higher resolution spectral display than the first resolution.

10. The apparatus of claim 9 further comprising:

wherein the processor is further configured to cumulate the first spectral data and second spectral data; and a data cache configured to hold the first spectral data and the second spectral data.

11. The apparatus of claim 9 wherein the processor is further configured to:
- (a) identify a first plurality of time intervals associated with the audio data;
- (b) generate the first spectral data from audio data associated with time intervals in the first plurality of time intervals;
- (c) identify one or more frequency components represented in audio data associated with time intervals in the first plurality of time intervals; and
- (d) generate the first spectral data from the identified frequency components.

12. The apparatus of claim 11 wherein the processor is further configured to:
- (a) identify a second plurality of time intervals associated with the audio data;
- (b) generate the second spectral data from audio data associated with time intervals in the second plurality of time intervals;
- (c) identify one or more frequency components represented in audio data associated with time intervals in the second plurality of time intervals, and
- (d) generate the second spectral data from the identified frequency components.

13. A non-transitory computer-readable medium comprising computer-executable instructions stored thereon for execution in a processor, the computer-readable medium comprising computer-executable instructions for:

acquiring audio data;

generating first spectral data at a first resolution of the audio data from a first portion of the audio data;

rendering a first spectral display from the first spectral data;

generating second spectral data at a second resolution of the audio data from a second portion of the audio data;

rendering a second spectral display from the first spectral data and the second spectral data;

wherein generating first spectral data at the first resolution of the audio data from the first portion of the audio data includes generating pixel data that are displayed in the first spectral display, the first resolution being a resolution view of pixel data representing the audio data; and wherein generating second spectral data at the second resolution of the audio data from the second portion of the audio data includes generating pixel data that are displayed in the second spectral display, the second resolution being a resolution view of pixel data representing the audio data, the second resolution having a higher resolution spectral display than the first resolution.

14. The non-transitory computer-readable medium of claim 13 further comprising computer-executable instructions for:

identifying a first plurality of time intervals associated with the audio data generating the first spectral data from audio data associated with time intervals in the first plurality of time intervals;

identifying a second plurality of time intervals associated with the audio data; and generating the second spectral data from audio data associated with time intervals in the second plurality of time intervals.

15. The method of claim 1, further comprising:

wherein the second spectral display is a frequency spectral display of frequency components associated with the first portion of audio data and the second portion of audio data;

wherein the step of generating first spectral data further comprises:

identifying a first plurality of time intervals associated with the audio data, each time interval from the first plurality of time intervals being separated by a first predetermined amount of audio data excluded from spectral analysis; and generating the first spectral data from audio data associated with time intervals in the first plurality of time intervals.

16. The method of claim 15, further comprising:

cumulating the first spectral data and the second spectral data as pixel data cumulated in a data cache; and wherein the first spectral data and the second spectral data used to render the second spectral display include first spectral data and second spectral data that has been cumulated.

17. The method of claim 16, further comprising:

wherein the step of generating second spectral data further comprises:

identifying a second plurality of time intervals associated with the audio data, each time interval from the second plurality of time intervals being separated by a second predetermined amount of audio data excluded from spectral analysis, the second predetermined amount of audio data being less than the first predetermined amount of audio data;

generating the second spectral data from audio data associated with time intervals in the second plurality of time intervals;

wherein the step of generating the second spectral data from audio data associated with time intervals in the second plurality of time intervals further comprises:

identifying one or more frequency components represented in audio data associated with time intervals in the second plurality of time intervals; and generating the second spectral data from the identified frequency components.

18. The method of claim 1, further comprising:

wherein acquiring audio data includes obtaining audio data having a predetermined length;

generating a series of spectral data segments each corresponding to one of a series of selected time intervals across the predetermined length of the audio data, a total combined length of the series of selected time intervals being less than the predetermined length of the audio data, each time interval in the series of time intervals being separated by a predetermined amount of audio data skipped between intervals;

rendering each spectral data segment of the series of spectral data segments at a spectral display location corresponding to the selected time intervals of the audio data for which that spectral data segment was generated; and concurrently rendering at least one spectral data segment of the series at a spectral display location corresponding to audio data skipped from spectral analysis.

19. The method of claim 18, further comprising:

wherein concurrently rendering at least one spectral data segment of the series at a spectral display location corresponding to audio data skipped from spectral analysis comprises:

concurrently rendering at least one spectral data segment of the series at spectral display locations corresponding to time intervals between the selected time interval of the audio data for which that spectral data segment was generated and a next adjacent selected time interval; and repeating generating a series of spectral data segments, rendering each spectral data segment of the series and concurrently rendering at least one spectral data segment of a series for multiple iterations, and in each iteration, generating a series of spectral data segments for different spectral display locations corresponding to different time intervals of the audio data as compared to former iterations.

20. The method of claim 1, further comprising:

wherein acquiring audio data includes obtaining audio data having a predetermined length;

generating a series of spectral data segments, wherein each respective spectral data segment corresponds to one of a series of selected time intervals across the predetermined length of audio data, a total combined length of the series of selected time intervals being less that the predetermined length of the audio data, the selected time intervals being separated by an amount of audio data not included in spectral analysis; and displaying the series of spectral data segments at progressively higher resolutions, wherein a given spectral data segment is displayed at a higher view resolution than a previously generated spectral data segment.

* * * * *